US008520242B2

(12) United States Patent
Chang

(10) Patent No.: US 8,520,242 B2
(45) Date of Patent: Aug. 27, 2013

(54) MANAGEMENT SYSTEM OF TECHNICAL LITERATURE DATA AND METHOD THEREOF

(75) Inventor: Chao Chin Chang, Taichung (TW)

(73) Assignee: Jack Technology Inc., Taichung (TW)

( * ) Notice: Subject to any disclaimer, the term of this patent is extended or adjusted under 35 U.S.C. 154(b) by 406 days.

(21) Appl. No.: 12/929,618

(22) Filed: Feb. 4, 2011

(65) Prior Publication Data

US 2011/0131632 A1 Jun. 2, 2011

Related U.S. Application Data

(63) Continuation-in-part of application No. 12/346,775, filed on Dec. 30, 2008, now Pat. No. 8,373,880.

(60) Provisional application No. 61/282,413, filed on Feb. 4, 2010.

(51) Int. Cl.
*G06F 15/00* (2006.01)
*G06F 3/12* (2006.01)
*G06K 1/00* (2006.01)

(52) U.S. Cl.
USPC .................................. 358/1.15; 358/1.13

(58) Field of Classification Search
None
See application file for complete search history.

(56) References Cited

U.S. PATENT DOCUMENTS

| 2006/0071903 A1* | 4/2006 | Shiono et al. ................. 345/156 |
| 2008/0109762 A1* | 5/2008 | Hundal et al. ................. 715/855 |
| 2008/0313179 A1* | 12/2008 | Trepess et al. .................... 707/5 |
| 2009/0132496 A1* | 5/2009 | Chen et al. ......................... 707/3 |

\* cited by examiner

*Primary Examiner* — Douglas Tran
(74) *Attorney, Agent, or Firm* — Bacon & Thomas, PLLC

(57) ABSTRACT

A management system of technical literature data and the method thereof are disclosed. According to the user's authority corresponding to the user identification, the invention reads out function items that can be accessed by the user. An operating interface displaying the function items, provides the user for manipulating function corresponding to the displayed function items so that multiple users can manage technical literature data together. This can efficiently share notes for the technical literatures, achieving the goal of studying a lot of technical literatures by division of labor and reducing system operation loading.

20 Claims, 15 Drawing Sheets

MANAGEMENT SYSTEM OF TECHNICAL LITERATURE DATA AND METHOD THEREOF

RELATED APPLICATIONS

This application is a continuation in part of U.S. application Ser. No. 12/346,775, filed Dec. 30, 2008, and claims benefit of U.S. Provisional Application Ser. No. 61/282,413, filed Feb. 4, 2010; U.S. application Ser. No. 12/267,617, filed Nov. 10, 2008, U.S. application Ser. No. 12/545,870 filed Aug. 24, 2009 and the aforementioned applications are hereby incorporated by reference.

BACKGROUND OF THE INVENTION

1. Field of Invention

The invention relates to a data management system and the method thereof. In particular, the invention relates to a management system of technical literature data and the method thereof.

2. Related Art

During the beginning phase of techniques research and development (R&D), it usually takes a lot of manpower and time to search and read technical literatures, such as patents. Therefore, some companies make use of external database searches to extract a few patents or classification numbers. Using the patents and classification number, the company analyzes patents and their interrelations via characteristic tables. Some other companies provide user interfaces for the user to select analysis types and set analysis conditions. The analysis conditions are converted into search conditions in a specific format. The search conditions are then used to find relevant data in the database and generate the analysis results.

However, among the products that provide technical literature analysis, no one provide an efficient operation interface for multiple users depending on their updating status or new assignment by project leader. Only single user for their individual work is normally found. Therefore, different members in one R&D team have to perform searches independently. Each member cannot share his/her notes about the literatures he/she has read with others. Therefore, the manager of the R&D team cannot effectively manage the members thereof.

In summary, the prior art always has the problem that technical literature data analysis work cannot be efficiently shared and managed, then further results in system operation loading. It is thus imperative to provide a better solution.

SUMMARY OF THE INVENTION

In view of the foregoing, the invention discloses a management system of technical literature data and the method thereof.

The management system of technical literature data includes: a authority setting module for setting user's authorities according to corresponding user identification (ID); a storage module for storing user authorities and comprising a database that stores technical literature data; a login module for verifying the received user ID and logging the user into the system after successful verification; a data retrieving module for determining the user's authority according to the received user ID and reading out the corresponding function items accordingly; and a displaying module for displaying an operating interface that contains function items and for providing functions available to the user.

The management method of technical literature data includes the steps of: providing technical literature data; logging a user into the system according to user ID; determining user's authority according to the user ID; reading out functions according to the user's authority; and displaying an operating interface with function items; wherein the operating interface provides the functions corresponding to the function items.

The disclosed system and method differ from the prior art in that the invention uses the user's ID to find out the corresponding authority and thus the available function items. The operating interface displaying the function items provides for manipulating the corresponding functions. Multiple users can team-work easily and more efficiently to access or manage large amount of technical literature data. The present invention therefore solves problems in the prior art and seeks for much more efficiently studying a lot of technical literatures by division of labor and collecting back under minimized system resource. In addition, because the present invention also translates technical literature data into different states, the present invention can greatly reduce the system load caused by repetitive or many users trying to open graphic format files simultaneously.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

The invention can provide the operating interface that includes the function items available to each user according to the user's authority. The user can browse shrunk image in the operating interface. The user's authority referred herein defines the function items available to the user.

The technical literature data referred herein are the literatures discussing specific technical contents. They include, but not limited to, journals, research papers, patents, and/or manuals.

Figure 1:
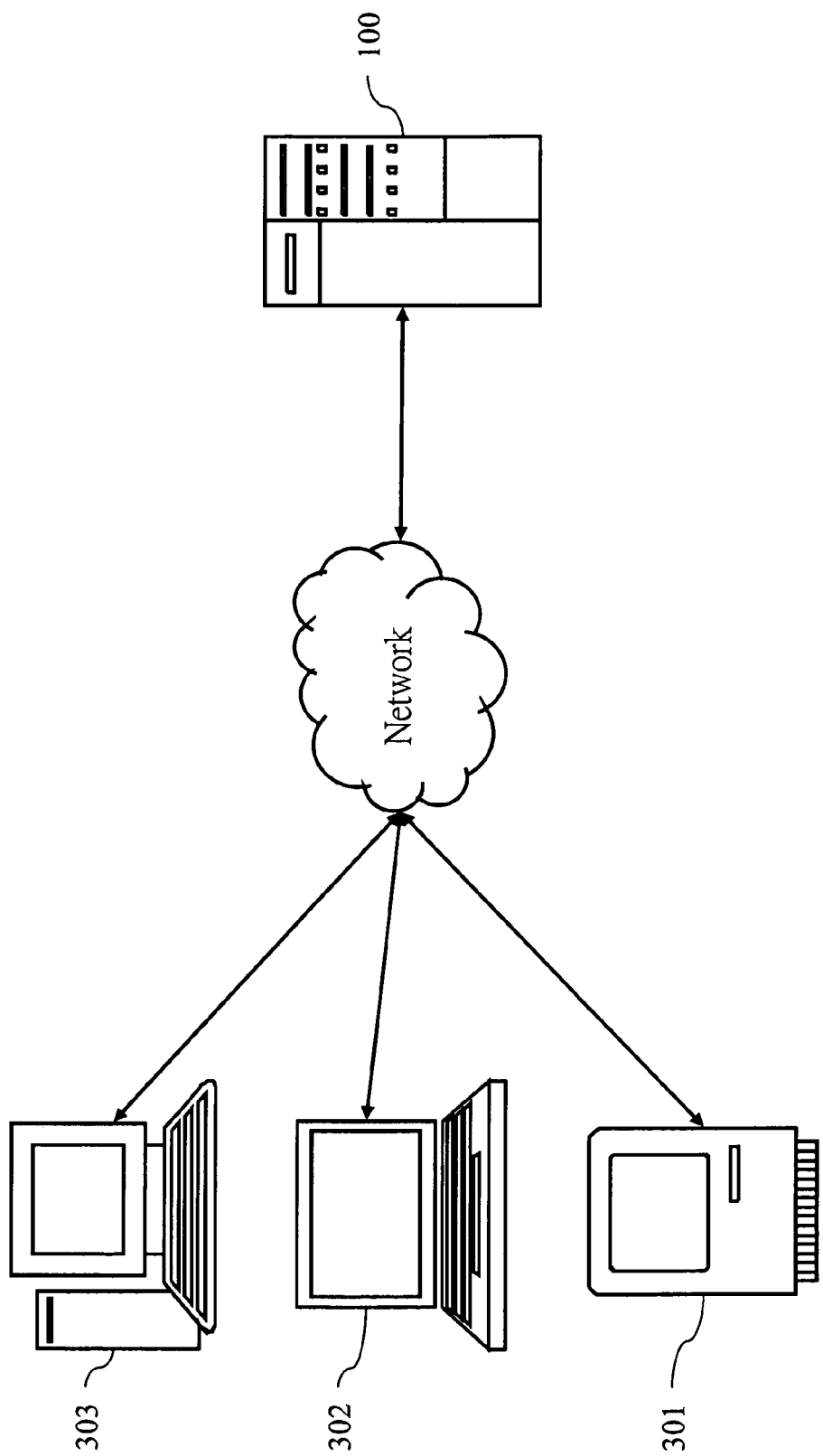
FIG. 1 shows the structure of the disclosed management system of technical literature data.

The structure of the invention is shown in FIG. 1. Different users operating different client ends 301, 302, 303 connect to the disclosed server 100 via a network. The server 100 sends the operating interface containing the function items available to each user to the corresponding client end. Each user can use the invention via the operating interface at the client end.

Figure 2:
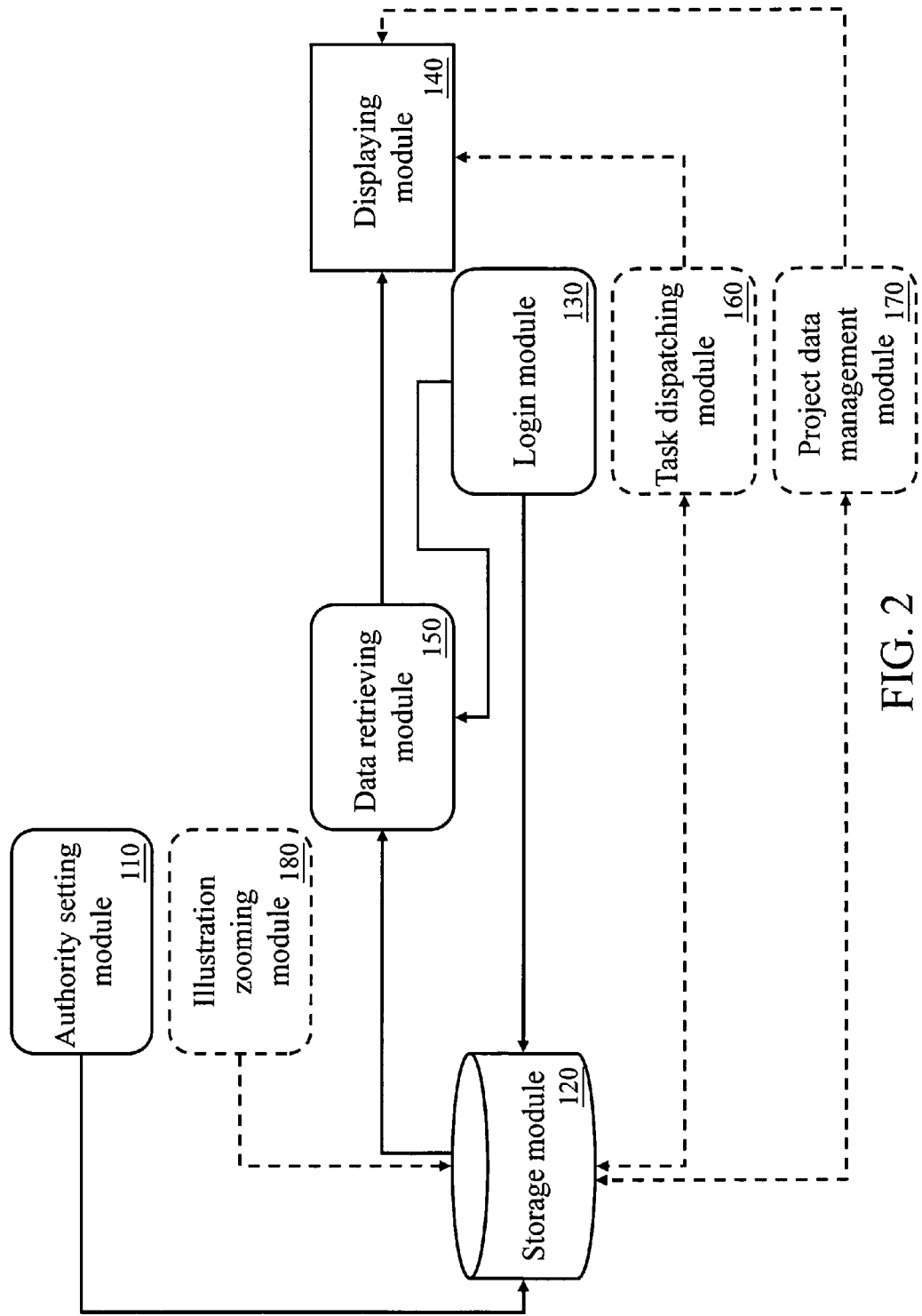
FIG. 2 is a schematic view showing the elements of the server of the invention.

FIG. 2 shows the system structure in the disclosed management method of technical literature data. As shown in the drawing, the disclosed system includes an authority setting module 110, a storage module 120, a login module 130, a displaying module 140, and a data retrieving module 150.

Figure 3:
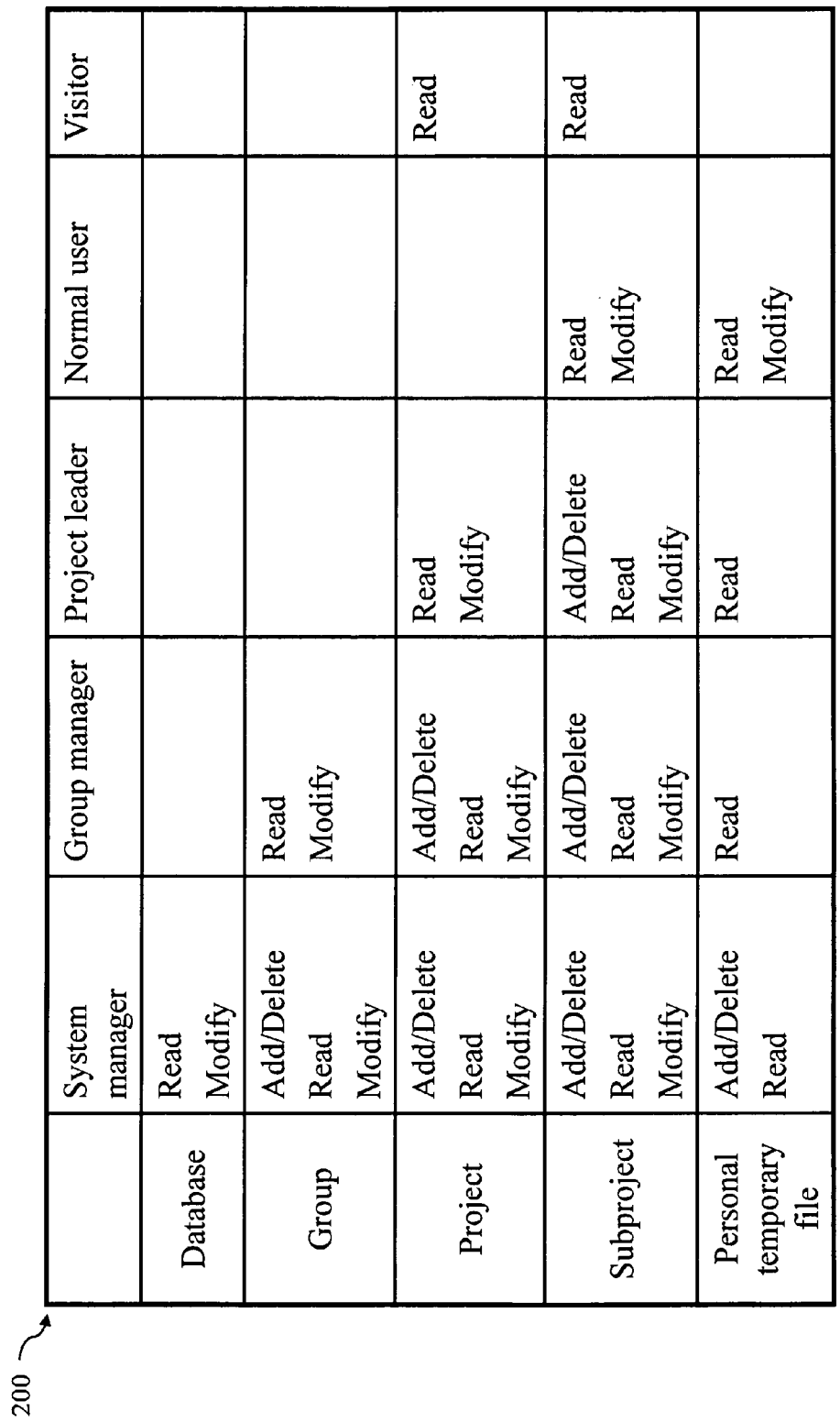
FIG. 3 shows the authorities in the first embodiment.
Figure 4A:
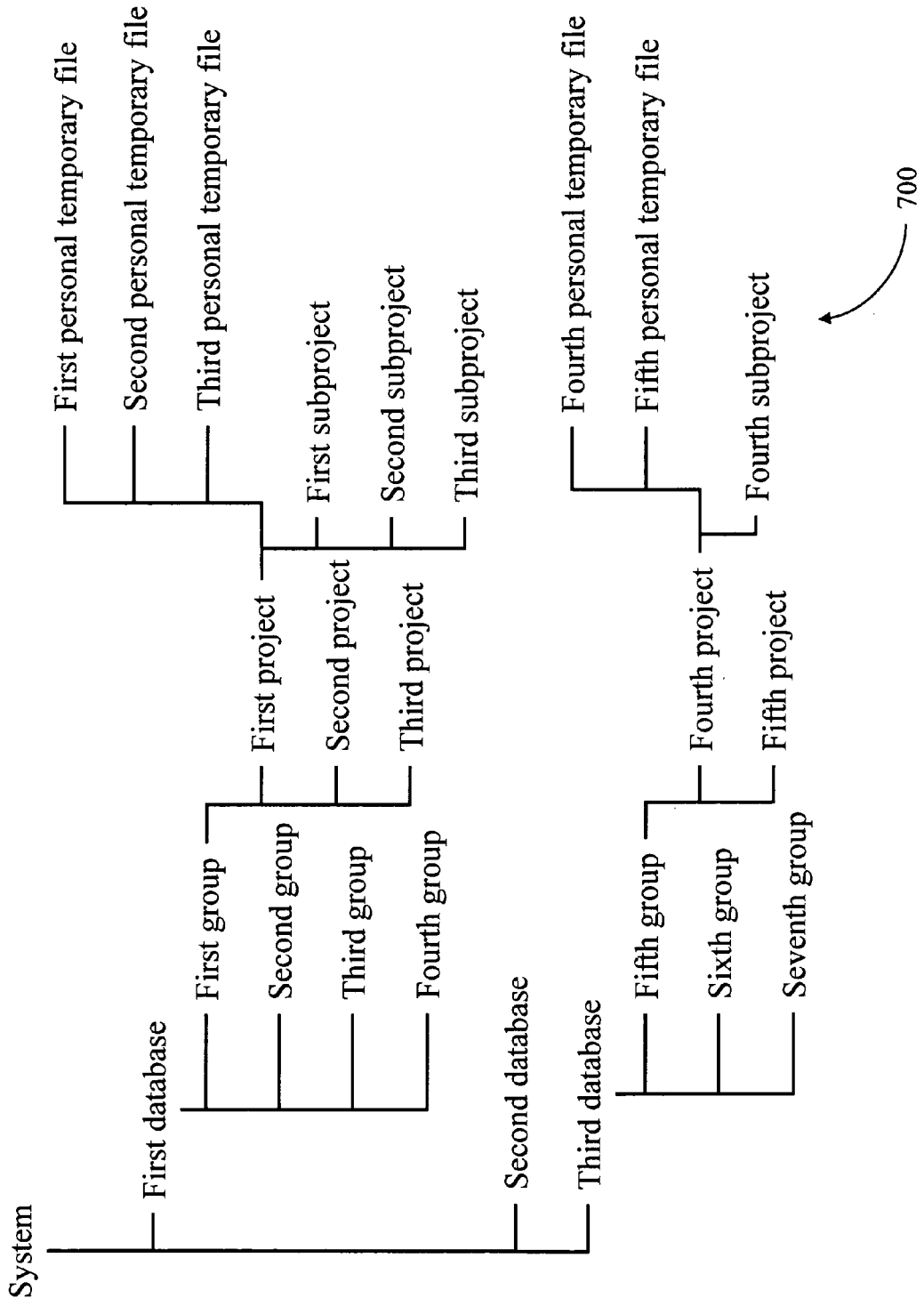
FIGS. 4A to 4D show the data storage structure in the first embodiment.
Figure 4B:
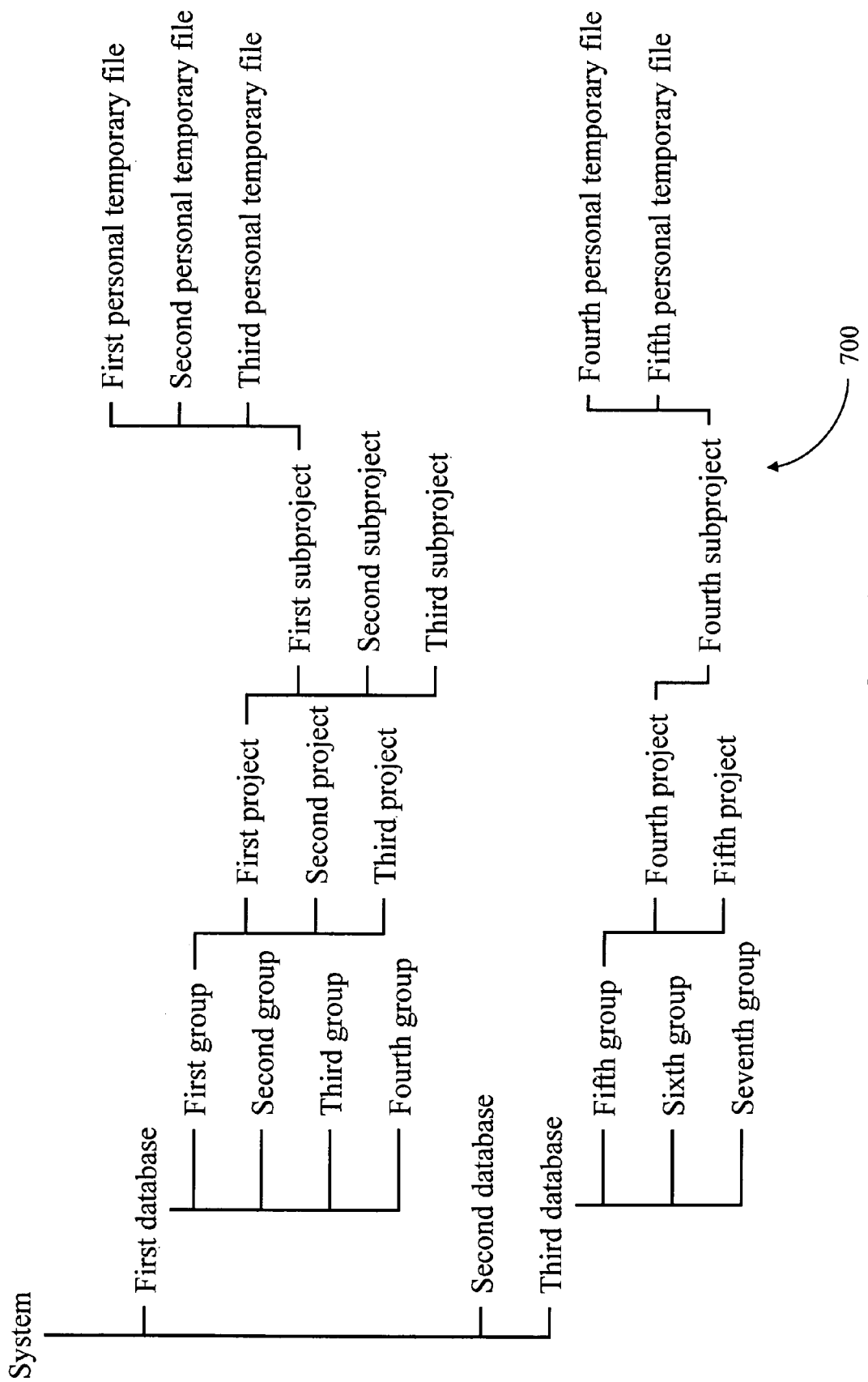
Figure 4C:
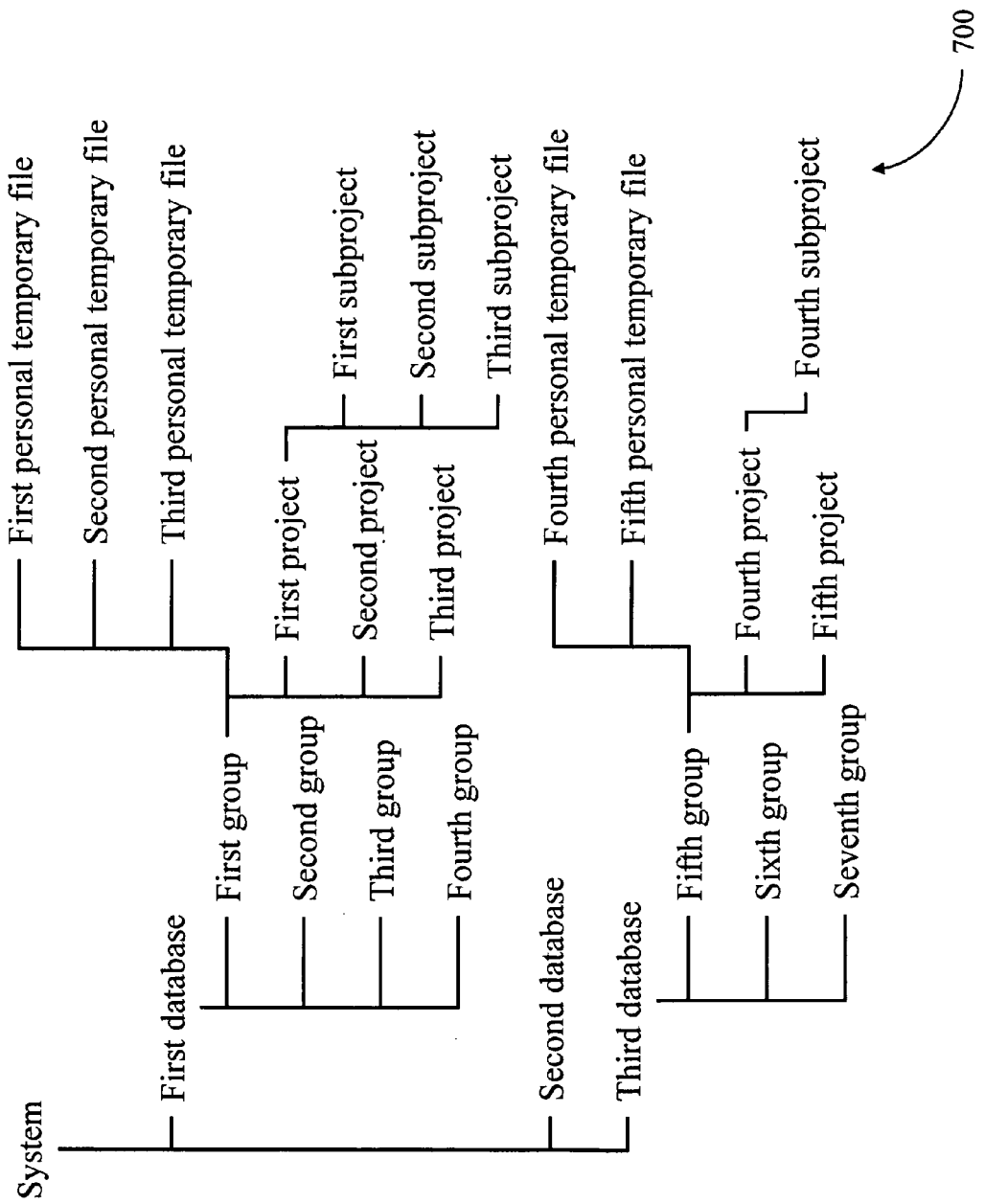
Figure 4D:
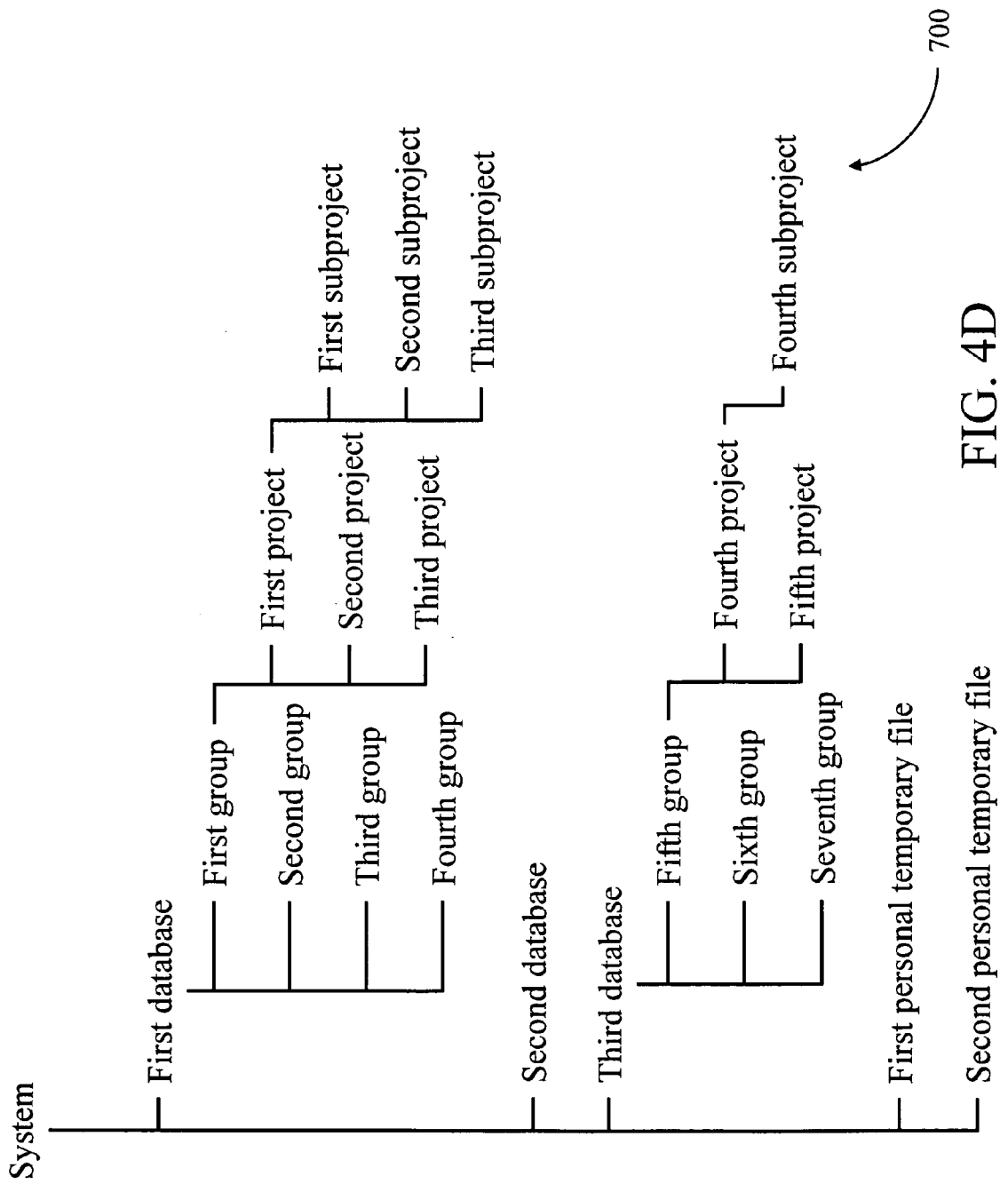

The authority setting module 110 sets the user's authority for the corresponding user. In the invention, the authority setting module 110 can set user's authority by default. As shown in FIG. 3, table of authorities 200, the invention includes: system manager, group manager, project leader, normal user, and visitor. The user's authority of the visitor only allows the user to use the basic function items of the invention to read data stored in the storage module 120. The user cannot modify any data in the storage module 120. The user's authority of the normal user allows the user to operate basic function items of the invention. That is, the normal user can read or modify data stored in the storage module 120 using the basic function items. The project leader has the user's authority of manipulating function items related to project management, in addition to the basic function items of the normal user. So the project leader can read or modify the projects thereof, or even open subprojects for normal users. The group manager has a user's authority similar to that of the project leader. However, the group manager can further create new projects for project leaders under the group thereof. The system manager has the user's authority of using all function items provided by the invention. That is, in addition to basic function items and project management function items, the system manager can further manipulate function items related to system management, such as creating groups or setting user's authority. The invention, however, is not limited to such possibilities. When the authority setting module 110 sets a user as a normal user, the user can only operate basic function items of the invention. The user types and the corresponding user's authorities are not limited to those mentioned above.

Moreover, the authority setting module 110 does not need to set user's authority by default. The authority setting module 110 can set available function items individually for specific users, or add/delete some available function items to/from the default ones.

Generally speaking, the authority setting module 110 is not a basic function. That is, usually only the system manager can operate the authority setting module 110.

The storage module 120 stores the user ID of users that use the invention and the corresponding user's authorities set by the authority setting module 110. The user ID stored in the storage module 120 contains, but not limited to, user's accounts and passwords. The storage module 120 also includes at least one database for storing technical literature data.

The storage module 120 can also allow normal users to have personal temporary files, so that normal users can store personal temporary data during the process of using the invention. The personal temporary file is usually set up at a specific storage path in the storage module 120. However, the invention is not restricted to this possibility. The personal temporary file of the normal user can be established under the project/subproject contained in the database or in the group that contains the project. The personal temporary files can be set up under the data storage structure 700 shown in FIG. 4A, 4B, 4C, or 4D.

The login module 130 verifies the user ID entered by the user against the user ID store in the storage module 120. When the entered user ID agrees with some user ID in the storage module 120, it means that the verification is successful. The login module 130 lets the user to log into the invention and use the invention. If the entered user ID does not agree with any user ID in the storage module 120, the login module 130 does not allow the user to log in and use the invention.

The data retrieving module 150 uses the entered user ID to read out the corresponding user's authority from the storage module 120, and enables the user to operate available function items accordingly.

The data retrieving module 150 also reads out the corresponding things to be done from the storage module 120.

The displaying module 140 displays an operating interface for the user to operate. The operating interface shown by the displaying module 140 includes function items available to the user. The user can select a function item in the operating interface to execute the corresponding function, thereby managing the technical literature data, such as browsing, reading, and/or setting technical literature data.

Besides, the displaying module 140 also displays personal contents of the user in the operating interface, such as the things to be done read out by the data retrieving module 150. The user can thus quickly learn all things to be done in the operating interface. Since the things to be done are depending on different users, the operating interface of each user may be different from others'.

It should be mentioned that the invention may include other modules according to the available function items for each user. For example, it may include a task dispatching module 160 and/or a project data managing module 170. However, the invention is not limited to such examples.

The task dispatching module 160 enables the user to set data related to the project, such as project participants or members for searching related technical literature data. The invention is not limited to such possibilities.

Generally speaking, the task dispatching module 160 is not a basic function. The user has to have the authority of the project leader or the authority of modifying the project in order to manipulate the task dispatching module 160.

The project data managing module 170 enables the user to edit the technical literature data of the project, such as setting the technical literature data of the project, setting subprojects of the project, setting relation information or suggestion data of the technical literature data, or classifying the technical literature data. The subprojects to be set by the user by default can include such items as "original data", "related data", "classified data", and "important data". The relation information provided by the project data managing module 170 refer to data related to the technical literature data, including representative illustrations/characteristic illustrations or abstract thereof, but not limited to such possibilities.

The project data managing module 170 also updates the data of the user about the technical literature data belonging to the project, such as being read or not, important or not, and/or even a tree diagram. The tree diagram referred herein is similar to the multinomial tree. Each node in the tree diagram is the technical contents of the technical literature data. The technical contents of each daughter node are contained in those of the mother node thereof.

The functions provided by the project data managing module 170 to the user are determined by the corresponding authority of the user in the invention. For example, the project data managing module 170 may allow the normal user to set the relation information or prompt data of the technical literature data, or to classify the technical literature data. In addition to all functions available to the normal user, the project data managing module 170 further provides the project leader to set the technical literature data belonging to the project, and the subprojects of the project. The invention, however, is not limited to such possibilities.

The project data managing module 170 also determines whether there is a duplicate literature in the storage module 120 when a literature of the project is imported. If it is a duplicate, the technical literature data is tagged. Besides, the project data managing module 170 also stores such information as the search condition, import time, classified time, and classified user, and the technical literature data into the storage module 120.

Moreover, the invention can further include an illustration zooming module 180 for zooming the representative illustration or characteristic illustration of the technical literature data of the project. The user can thus view the zoomed representative illustration or characteristic illustration in the operating interface shown by the displaying module 140. The illustration zooming module 180 zooms the entire representative illustration or characteristic illustration, or extracts a part from the relation information to zoom. When the cursor hovers to the representative illustration or characteristic illustration, the illustration zooming module 180 can zoom only the part of the representative illustration or characteristic illustration around the cursor. The illustration zooming module 180 can also zoom a specific area defined by dragging and selecting the area with the cursor. The illustration zooming module 180 can even zoom the entire representative illustration or characteristic illustration or a specific area thereof by a particular ratio in an analog way, the ratio being determined by, for example, rolling the wheel on the mouse. In particular, the magnification ratio can be 1.1 to 4. For a better visual sensation, the ratio is 1.3 to 1.7. However, the invention is not limited to these examples.

Figure 5A:
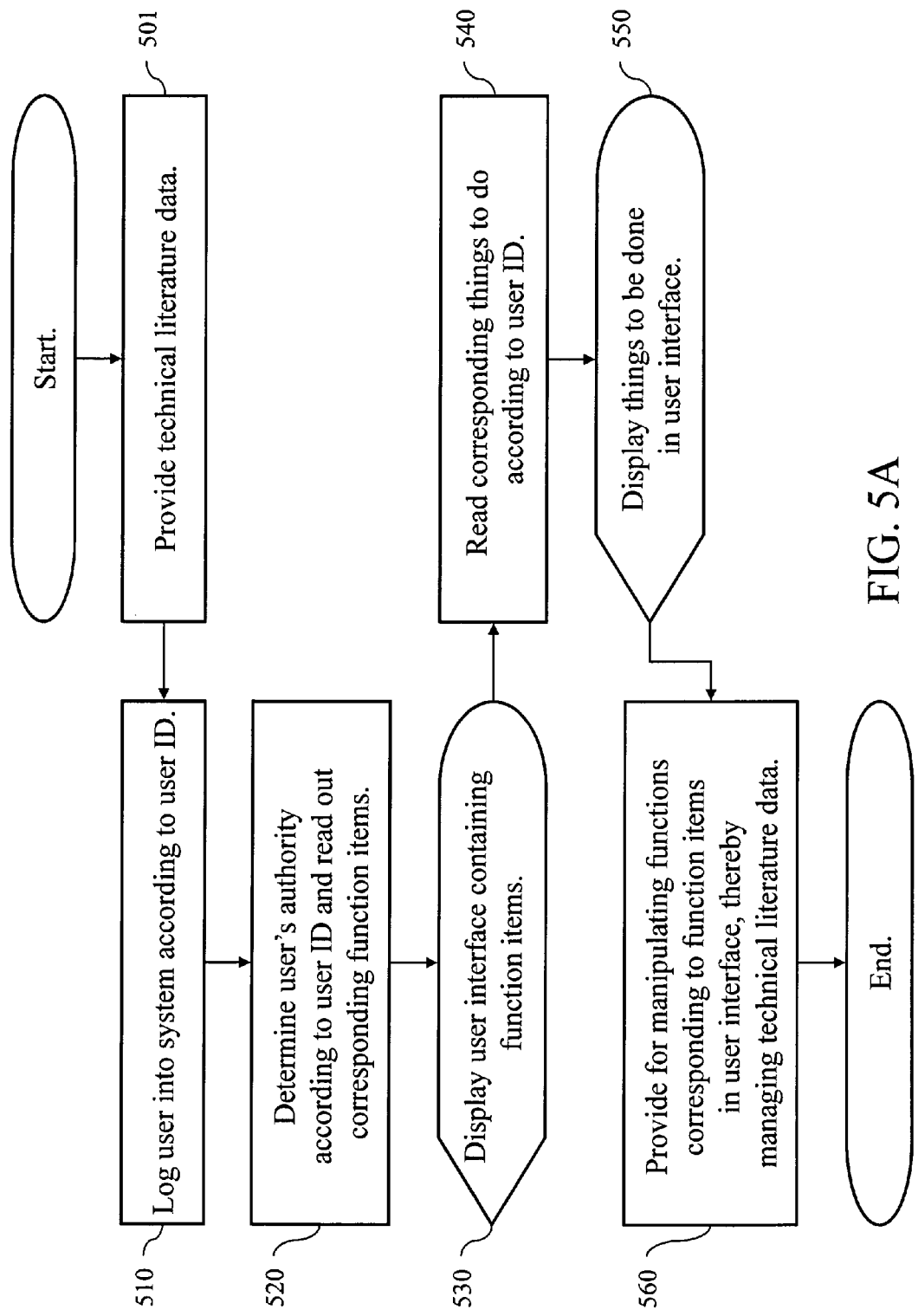
FIG. 5A is a flowchart of the disclosed management method of technical literature data.

A first embodiment is used to explain the operations of the disclosed system and method. FIG. 5A shows a flowchart of the disclosed management method of technical literature data.

In this embodiment, there are three default user's authorities: the system manager who can operate all functions; the normal user who can only perform basic functions such as browsing, reading, classifying, commenting, analyzing, and tracking; and the project leader who can manage projects and the basic functions. The invention of course is not limited to this particular example.

First, a first user with the user's authority of the system manager has to enter his user account and password as the user ID from a first client end 301. After receiving the user ID entered by the first user, the login module 130 determines whether the storage module 120 has user ID identical to the one entered by the first user. If so, the login module 130 logs the first user into the system (step 510).

After the first user logs in, the data retrieving module 150 determines the user's authority according to the user ID. Since in this embodiment the first user has the user's authority of the system manager, the data retrieving module 150 reads out all function items (step 520).

Figure 6A:
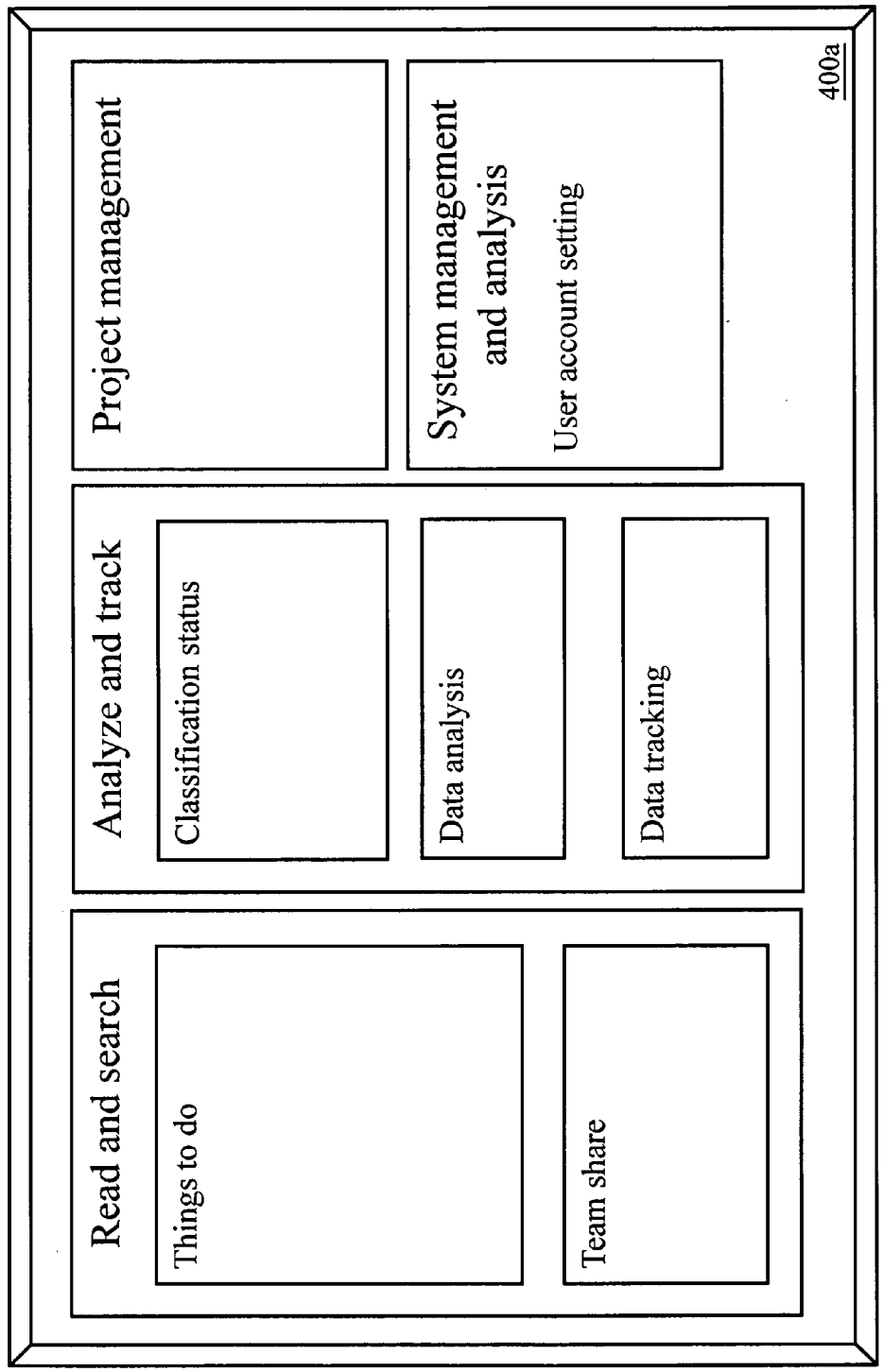
FIG. 6A is a schematic view of the operating interface of the system manager according to the first embodiment.

Afterwards, the displaying module 140 shows an operating interface 400a containing all the function items read out by the data retrieving module 150. As shown in FIG. 6A, there are basic functions such as "read and search" and "analyze and track", project management function, and system functions such as "system management" and "system analysis" (step 530).

After the displaying module 140 displays the operating interface 400a with all function items, the first user can select the function "add user" in the function of "system management" to set up a second user account and password and to set the user's authority as the project leader. The first user can also set up a third user account and password and set the user's authority as the normal user. Thus, the second user and the third user can log into the server 100.

After the first user sets the user ID and authorities of the second user and the third user, the authority setting module 110 uses the user ID of the second/third user to set the corresponding user's authority. The second user can operate the basic reading and managing function and the project management function later on.

Afterwards, the second user needs to enter the user account and password on a second client end 302. After receiving the user ID entered by the second user, the login module 130 determines whether the storage module 120 has the identical user ID. Since the first user has set up the user ID of the second user, the login module 130 can find in the storage module 120 the user ID consistent with those entered by the second-user. This means that the login has been verified. The login module 130 thus logs the second user into the system (step 510).

After the second user logs into the system, the data retrieving module 150 uses the user ID to determine the corresponding user's authority. Since in this embodiment the second user has the user's authority of the project leader, the data retrieving module 150 reads out the corresponding function items of "project management" and the basic functions (step 520), but not system functions of "system management" and "system analysis".

Figure 6B:
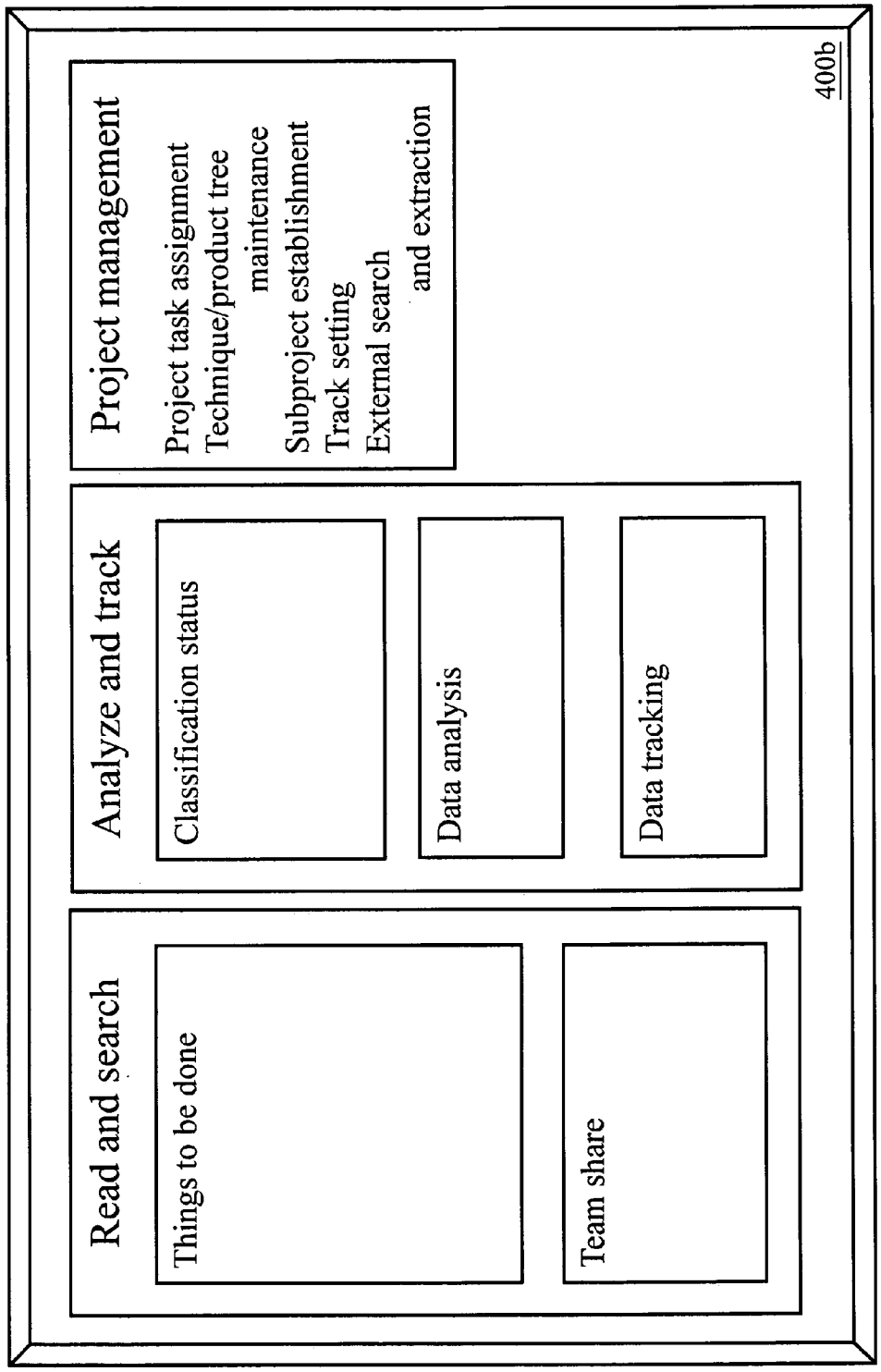
FIG. 6B is a schematic view of the operating interface of the project leader according to the first embodiment.

After the data retrieving module 150 reads out the function items, the displaying module 140 shows the operating interface 400b of function items. As shown in FIG. 6B, there are basic functions as "read and search" and "analyze and track" and the project management functions (step 530). It should be mentioned that the system functions of "system management" and "system analysis" are not shown in the operating interface 400b as in the operating interface 400a of the first client 301.

Figure 5B:
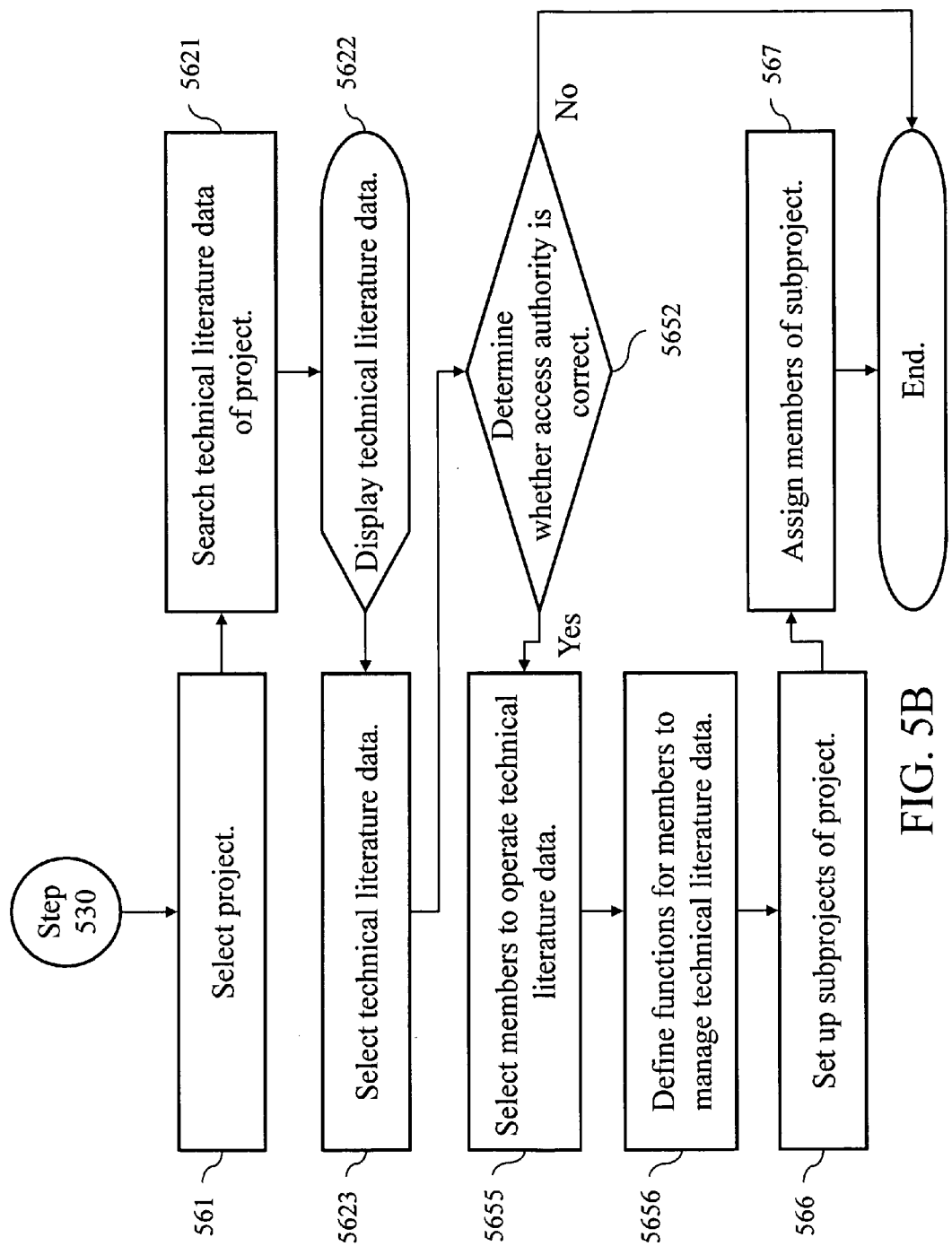
FIG. 5B is a flowchart of the task dispatching according to the invention.

After the displaying module 140 displays the operating interface 400b, the second user can select the "external search and extraction" function of the "project management" function. In this case, as shown in FIG. 5B, the project data management module 170 searches for technical literature data in an external database (e.g., patents) (step 5621) after allowing the second user to select the project to operate (step 561). The invention is not limited to the above-mentioned example though.

The displaying module 140 can list the technical literature data found by the project data management module 170 in a table (step 5622), so that the second user can select the technical literature data of the project he/she is working on via the project data management module 170 (step 5623). Afterwards, the database of the storage module 120 stores the technical literature data selected by the second user, so as to import the selected technical literature data into the database of the storage module 120. The technical literature data can thus be provided to the third user to manage. In practice, this process is step 501 of providing technical literature data for the third user.

In fact, the project data management module 170 can also store the search conditions and import time along with the technical literature data into the database of the storage module 120 when search the external database. Moreover, if the second user further classifies the searched technical literature data, the project data management module 170 also stores the classified time, and classified user's ID into the database of the storage module 120.

The second user can also select the "technology/product tree maintenance" function of the "project management" function. In this case, the project data management module 170 provides the second user with the tree diagram corresponding to editing the technical literature data of each of the projects (step 560). Each node of the tree diagram usually has the technical features of the technical literature data of the project. After the second user finishes the editing of the tree diagram, the project data management module 170 stores the edited tree diagram to the database of the storage module 120.

Besides, the second user can select the "project task assignment" function of the "project management" function after selecting the technical literature data of the project via the project data management module 170 (step 5623). In this case, the project data management module 170 allows the second user to select members of the project (step 5655), such as a third user, and to set the work contents thereof, thereby defining the management functions of the member on the technical literature data (step 5656). The second user can further select the "subproject setup" function of the "project management" function, using the task dispatching module 160 to set the subprojects of the project (step 566) and to assign selected members to the subprojects (step 567), setting which project/subprojects the selected users can manage technical literature data. Through the above process, the second user can then manage the technical literature data (step 560). The project data management module 170 can further determine whether the access authority is correct according to the second user's authority read out by the data retrieving module 150 after the second user selects the "project task assignment" function of the "project management" function (step 5652). That is, it determines whether the second user can operate the "project task assignment" function. If so, the second user is allowed to operate the "project task assignment" function. That is, the second user can select a member to execute the project tasks (step 5655) and define the management function of the member on the technical literature data (step 5656). If not, the management function finishes.

Figure 6C:
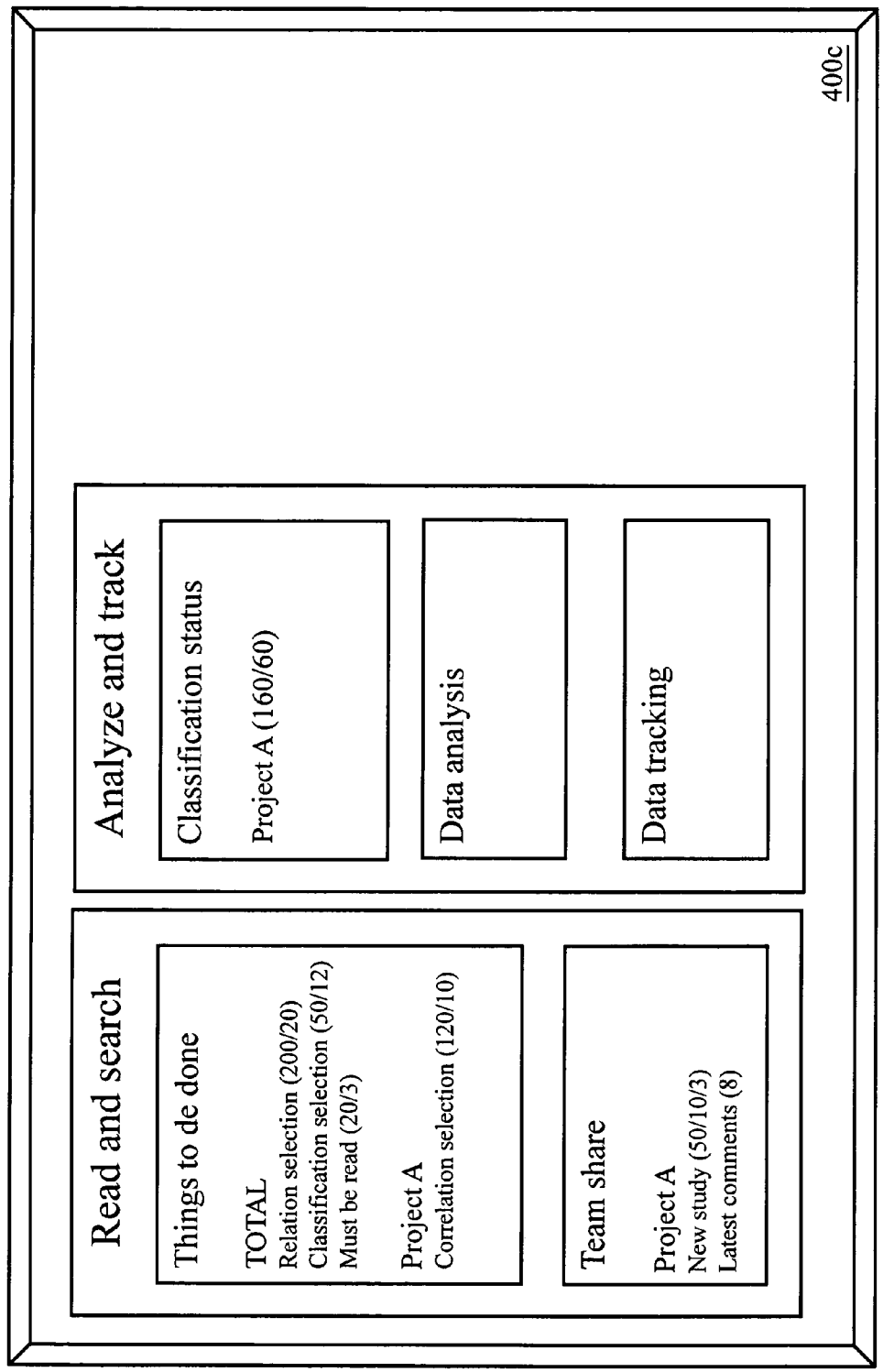
FIG. 6C is a schematic view of the operating interface of the normal user according to the first embodiment.

After the second user sets the project/subproject that the third user can participate, the third user can enter the user ID via the third client end 303. After successfully verifying the user ID entered by the third user, the login module 130 logs the third user into the server 100 (step 510). Afterwards, the data retrieving module 150 reads out the third user's authority from the storage module 120 according to the user ID entered by the third user, and reads out the function items according to the user's authority (step 520). That is, the data retrieving module 150 reads out the function items such as "read and search" and "analyze and track". The displaying module 140 displays an operating interface 400c containing the functions of "read and search" and "analyze and track", as shown in FIG. 6C.

In fact, before or after the data retrieving module 150 reads the user's authority and reads out the function items accordingly (step 520), the data retrieving module 150 also reads the corresponding things to do from the database of the storage module 120 according to the entered user ID (step 540). The displaying module 140 shows the things to be done in the operating interface 400c of the third user (step 550), such as the function items "relation selection", "classification selection", "must read" in FIG. 6C, where the first number in the parentheses indicates the number of technical literature data that the user has to process and the second number indicates the number of technical literature data to be processed by the user. Therefore, the user can learn how many things to be done from the second number in the parentheses. For example, in FIG. 6C the third user still has 20 technical literature data to do relation selection, 12 technical literature data to do classification selection, and 3 technical literature data to read.

After the displaying module 140 displays the operating interface 400c, the third user can select the "relation selection", "classification selection", "must be read" functions in the "read and search" function. Generally speaking, the third user should select the function of things to be done.

If the third user selects the "must be read" function item, the project data management module 170 reads the technical literature data marked as important in the database of the storage module 120 and shows them by the displaying module 140. The third user can then select the technical literature data to read in the operating interface. After the selection of the user, the technical literature data in the database of the storage module 120 are displayed by the displaying module 140 to the user (step 560).

Figure 5C:
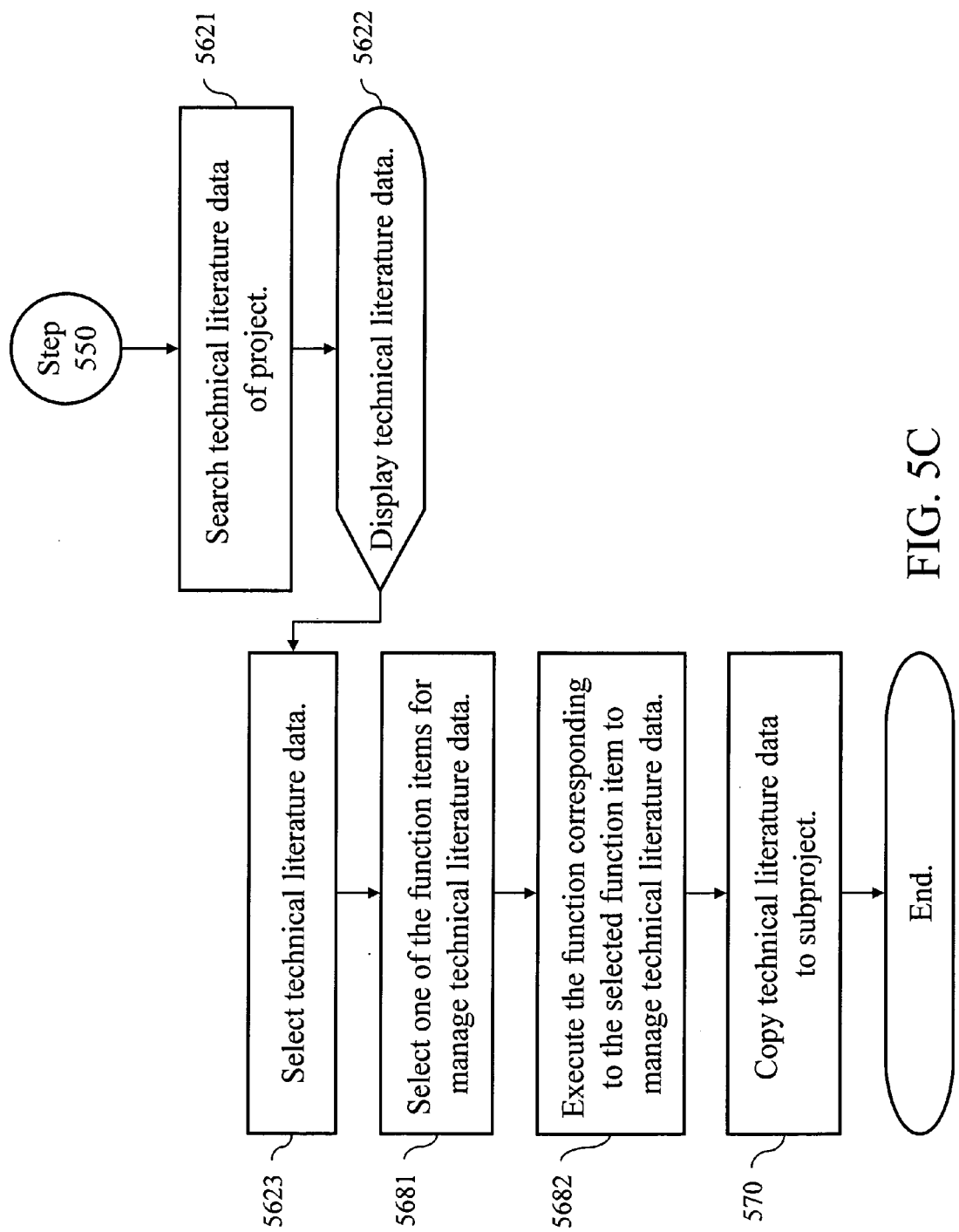
FIG. 5C is a flowchart of the task reception according to the invention.

If the third user selects the function item of "relation selection"/"classification selection", the project data management module 170 provides the third user to select the relation/classification of the technical literature data (step 560). When the third use selects the technical literature data, as shown in FIG. 5C, the project data management module 170 can search the stored technical literature data in the database of the storage module 120 (step 5621). The displaying module 140 lists the technical literature data found by the project data management module 170 (step 5622), thereby allowing the third user to select the technical literature data (step 5623). After the third user selects a function item to manage the technical literature data (step 5681), the project data management module 170 can execute the management function corresponding to the function item selected by the third user to manage the technical literature data (step 5682), such as selecting the technical literature data. However, the management behaviors of the invention are not limited to such an example. Finally, after the third user manages the technical literature data in the above way (step 560), the project data management module 170 copies the managed technical literature data to the subproject (step 570).

Figure 7A:
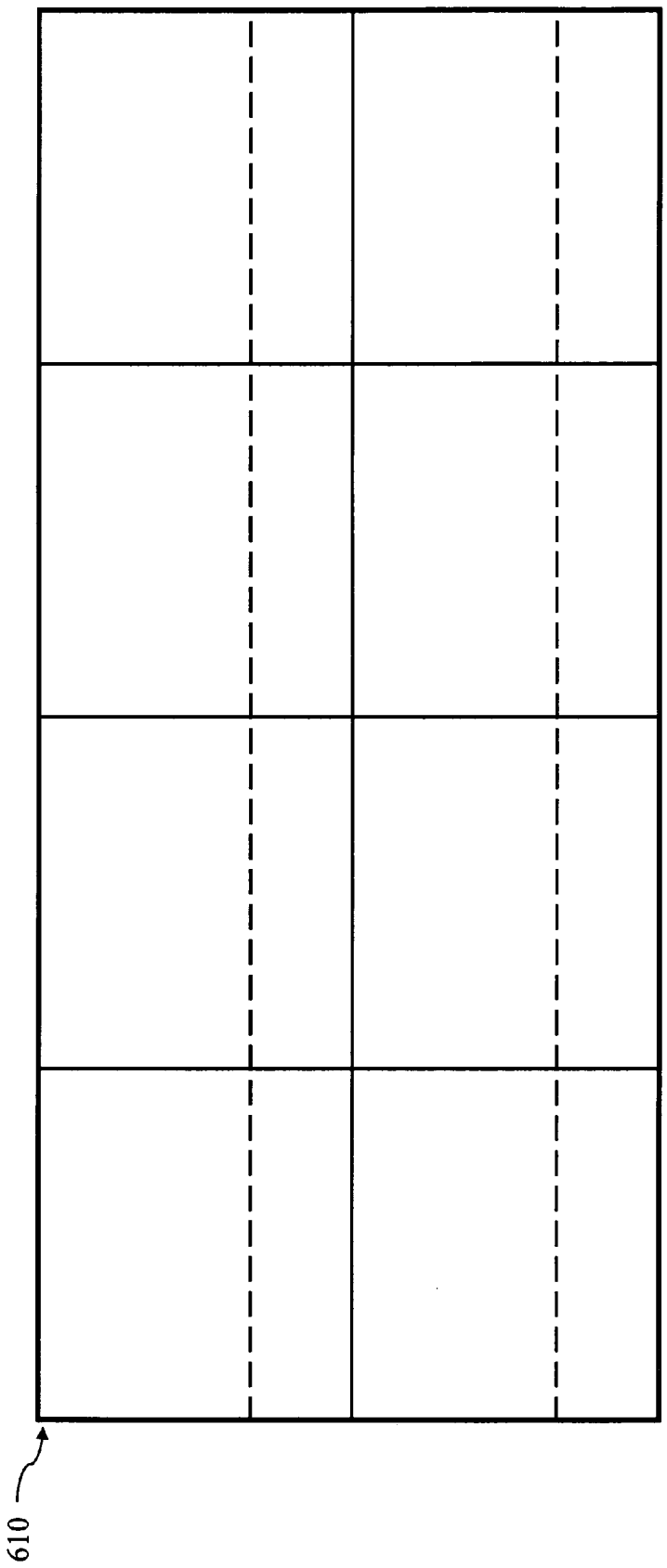
FIG. 7A is a schematic view of the technical literature data shown in a matrix.

In practice, in addition to listing the technical literature data in a conventional way (step 5622), the displaying module 140 can also use the m×n format shown in FIG. 7A (where m and n are integers larger than 1) to show the technical literature data according to their relations for the third user to select. In addition to the m×n format list, the arrangement can also be radial or annular as long as better visual sensation achieved. If the number of the technical literature data cannot be arranged as m×n, for example, 26, the arrangement of 4×7 format will leave two vacancies. However, this is still within the scope of m×n format.

Figure 7B:
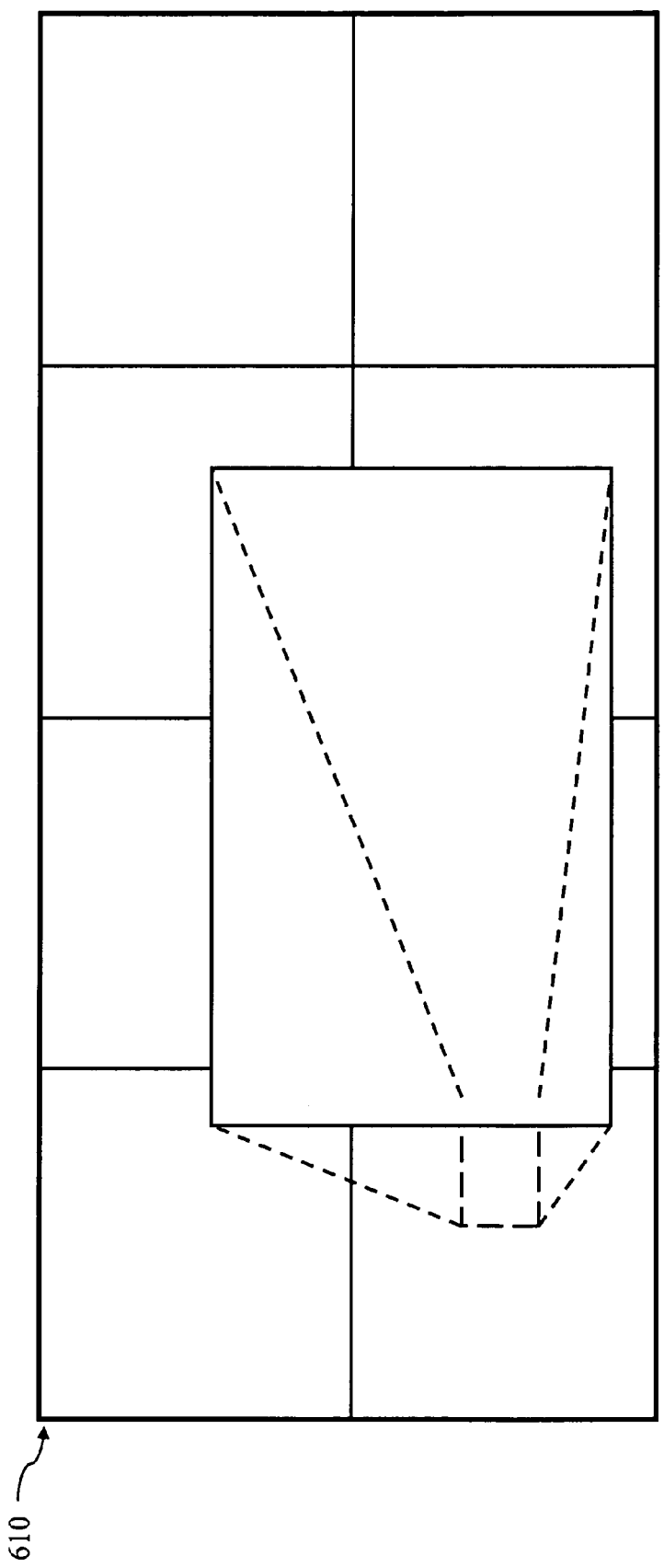
FIG. 7B is a schematic view showing a locally enlarged according to the first embodiment.

If the invention also has a illustration zooming module 180, then when the related information shown by the displaying module 140 in screen 610 includes illustrations (representative illustration or characteristic illustration), the illustration selected by the third user can be further zoomed. The third user may even be prompted to select a target to zoom to locally enlarge the interested area, as shown in FIG. 7B.

Besides, the project data management module 170 can also enable the third user to modify the illustration for the technical literature data as shown by the screen 610 in FIG. 7 (step 560).

A second embodiment is now used to explain the system and method of the invention. Please refer to the flowchart of the management method for technical literature data in FIG. 5A. This embodiment assumes five default user's authorities: system manager, visitor, normal user, project leader, and group manager. The invention is not limited to such types. The authorities of the system manager, normal user, and project leader are the same as the first embodiment. The group manager's authority includes that of the project leader and the abilities to establish a project in the group thereof and to assign projects to project leaders. The visitor can only browse and read the technical literature data.

First, a first user with the authority of the system manager logs into the system via the login module 130 (step 510). The data retrieving module 150 uses the user ID to determine the corresponding user's authority. Since the first user in this embodiment has the authority of the system manager, the data retrieving module 150 reads out all the function items (step 520). Afterwards, the displaying module 140 displays an operating interface containing all the function items read out by the data retrieving module 150 (step 530). The first user can select the "add user" function of the "system management" function. Thus, the first user can set up the user ID of a second user, a third user, a fourth user, and set their respective user's authority as the project leader, the normal user, and the group manager.

After the first user sets up the user ID and authorities of the second user, the third user, and the fourth user, the authority setting module 110 sets the user's authorities of the second/third user according to their user ID. If the invention further provides the personal temporary files for normal users, the authority setting module 110 also establishes a personal temporary file for the third user. In this embodiment, the authority setting module 110 establishes the personal temporary files outside the database of the technical literature data, as the data storage structure 700 shown in FIG. 4D.

After verifying the user ID entered by the fourth user, the login module 130 logs the fourth user into the system (step 510). After determining that the fourth user has the authority of the group manager according to the user ID, the data retrieving module 150 reads out the corresponding function items of the "project management" function and the basic functions (step 520). The displaying module 140 can display the operating interface containing the function items being read out (step 530), so that the fourth user can select the function item "project dispatch" (not shown) in the "project management" function within the user interface shown by the displaying module 140, thereby establishing a project in the group thereof. The project leader is also assigned. For example, the fourth user selects the second user as the project leader of the newly established project.

After the login module 130 verifies the user ID entered by the second user, the login module 130 logs the second user into the system (step 510). After determining the fact that the second user has the authority of the project leader according to the user ID, the data retrieving module 150 can also read out the corresponding function items of the "project management" function and the basic functions (step 520). The displaying module 140 can display an operating interface containing the function items being read out (step 530), so that the second user can operate the corresponding functions in the user interface shown by the displaying module 140. The second user can thus select projects to manage. He/she can manage the selected project and/or the technical literature data thereof as in the first embodiment (step 560).

Suppose the second user sets up the project/subproject that the third user will participate. If the login module 130 successfully verifies the user ID entered by the third user, the third user is logged into the server 100 by the login module 130 (step 510). Afterwards, the data retrieving module 150 reads out the authority of the third user from the database of the storage module 120 according to the user ID thereof (step 520). The corresponding things to do are also read out from the database of the storage module 120 (step 540). The displaying module 140 shows the things to be done in the operating interface (step 550).

After the displaying module 140 shows the operating interface, the third user can operate functions of the function items in the user interface shown by the displaying module 140. The third user can thus select the project/subproject to manage, and let the second user to manage the technical literature data in the selected project/subproject in the ways described in the first embodiment (step 560).

In summary, the present invention differs from the prior art in that it has the abilities to read out the function items available to each user according to the user ID authority, and to provide the functions corresponding to the function items displayed in the operating interface. Multiple users can manage the technical literature data together. This solves the problem in the prior art that the technical literature data cannot be efficiently shared and managed. The invention achieves the goal of efficiently studying a huge amount of technical literature data by division of labor under minimized system resource. In addition, because the present invention also translates technical literature data into different states, the present invention can greatly reduce the system load caused by repetitive or many users trying to open graphic format files simultaneously.

In addition, aforementioned embodiments may be used in conjunction with one of U.S. application Ser. No. 12/267,617, 12/545,870 or 12/346,775 or any combination of system or method in the U.S. application Ser. No. 12/267,617, 12/545, 870 or 12/346,775 for use.

Moreover, the disclosed system and method can be implemented in hardware, software, or the combination of the two. It can also be implemented in a centralized way in one computer system, distributed among several connected computers, or in a cloud system. The disclosed embodiments can be implemented in a compute program product with a computer code device. The computer code device is used to execute the disclosed management method of technical literature data. The computer code can be executed in a computer system and stored in a storage device (e.g., a memory device). The computer system accesses the computer code via the storage device.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A management system of technical literature data, comprising:
    an authority setting module for setting a user's authority corresponding to a user identification (ID);
    a storage module for storing the user's authorities, including a database for storing at least one set of technical literature data;
    a login module for verifying the received user ID and logging the user into the system after successful verification;

a data retrieving module for determining the user's authority according to the received user ID and reading out at least one function item according to the user's authority; and a displaying module for displaying an operating interface that includes the function items and providing for manipulating the functions corresponding to the function items, thereby managing the technical literature data.

2. The management system of technical literature data according to claim 1 further comprising a task dispatching module belonging to one of the functions for setting up users who manage the technical literature data.

3. The management system of technical literature data according to claim 1 further comprising a project data management module belonging to one of the functions for editing the technical literature data and/or updating data related to the technical literature data, for tagging duplicatedly imported technical literature data, and for saving searching conditions, import time, classified time, classified user, and the imported technical literature data to the database.

4. The management system of technical literature data according to claim 1 further comprising an illustration zooming module for zooming all or part of related information of the technical literature data.

5. The management system of technical literature data according to claim 4, wherein the illustration zooming module zooms the entire representative illustration or characteristic illustration, or zooms an extracted part from the relation information.

6. The management system of technical literature data according to claim 5, wherein the illustration zooming module zooms the part of the representative illustration or characteristic illustration around the cursor when the cursor hovers to the representative illustration or characteristic illustration, or zooms a specific area defined by dragging and selecting the area with the cursor.

7. The management system of technical literature data according to claim 4, wherein the illustration zooming module zooms the entire representative illustration or characteristic illustration or a specific area thereof by a particular ratio in an analog way, wherein the ratio is 1.3 to 1.7.

8. The management system of technical literature data according to claim 1, wherein the data retrieving module further reads out things to be done corresponding to the user ID from the database and the displaying module further displays the things to be done in the operating interface.

9. The management system of technical literature data according to claim 1, wherein the management system further comprising:

a task dispatching module belonging to one of the functions for setting up users who manage the technical literature data;

a project data management module belonging to one of the functions for editing the technical literature data and/or updating data related to the technical literature data, for tagging duplicatedly imported technical literature data, and for saving searching conditions, import time, classified time, classified user, and the imported technical literature data to the database; and an illustration zooming module for zooming all or part of related information of the technical literature data, wherein the illustration zooming module zooms the part of the representative illustration or characteristic illustration around the cursor when the cursor hovers to the representative illustration or characteristic illustration, zooms a specific area defined by dragging and selecting the area with the cursor, or zooms the entire representative illustration or characteristic illustration or a specific area thereof by a particular ratio in an analog way wherein the ratio is 1.3 to 1.7.

10. A management method of technical literature data, comprising the steps of:

providing at least one set of technical literature data;

logging a user according to a user ID;

determining a user's authority according to the user ID;

reading out at least one function item according to the user's authority; and displaying an operating interface containing the function items;

wherein the operating interface provides for manipulating the functions corresponding to the function items for managing the technical literature data.

11. The management method of claim 10, wherein the operating interface further provides another function for defining at least one function for a user to manage the technical literature data.

12. The management method of claim 10 further comprising the steps of:

selecting a project;

searching multiple technical literature data belonging to the project;

displaying the technical literature data;

selecting the technical literature data;

selecting one of the function items for managing the technical literature data; and executing the function corresponding to the selected function item.

13. The management method of claim 12, wherein the step of displaying the technical literature data is using a m×n format a radial arrangement, or an annular arrangement to display the technical literature data.

14. The management method of claim 12, wherein the step of executing the function corresponding to the selected function item is to edit the technical literature data and/or update data related to the technical literature data.

15. The management method of claim 10 further comprising the step of reading out corresponding things to be done according to the user ID and displaying the things to be done in the operating interface.

16. The management method of claim 10 further comprising the step of zooming all or part of related information of the technical literature data.

17. The management method of claim 16, the step of zooming all or part of related information of the technical literature data further comprising the step of zooming the entire representative illustration or characteristic illustration, or zooming an extracted part from the relation information.

18. The management method of claim 17, the step of zooming the entire representative illustration or characteristic illustration is zooming the representative illustration or characteristic illustration around the cursor when the cursor hovers to the representative illustration or characteristic illustration, the step of zooming an extracted part from the relation information is zooming the part of the representative illustration or characteristic illustration around the cursor or zooming a specific area defined by dragging and selecting the area with the cursor.

19. The management method of claim 17, the step of zooming all or part of related information of the technical literature data further comprising the step of zooming the entire representative illustration or characteristic illustration or a specific area thereof by a particular ratio in an analog way, wherein the ratio is 1.3 to 1.7.

20. The management method of claim 10 further comprising:

setting up users who manage the technical literature data;

reading out corresponding things to be done according to the user ID and displaying the things to be done in the operating interface;

selecting a project;

searching multiple technical literature data belonging to the project;

using a m×n matrix, a radial arrangement, or an annular arrangement to display the technical literature data;

selecting the technical literature data and selecting one of the function items for managing the technical literature data;

executing the function corresponding to the selected function item, comprising:

editing the technical literature data and/or updating data related to the technical literature data; and tagging duplicatedly imported technical literature data and saving searching conditions, import time, classified time, classified user, and the imported technical literature data to the database; and zooming the part of the representative illustration or characteristic illustration around the cursor when the cursor hovers to the representative illustration or characteristic illustration, zooming a specific area defined by dragging and selecting the area with the cursor, or zooming the entire representative illustration or characteristic illustration or a specific area thereof by a particular ratio in an analog way, wherein the ratio is 1.1 to 4.

* * * * *